July 20, 1937.  J. L. HUNT  2,087,516
METAL WINDOW SASH
Filed March 20, 1936
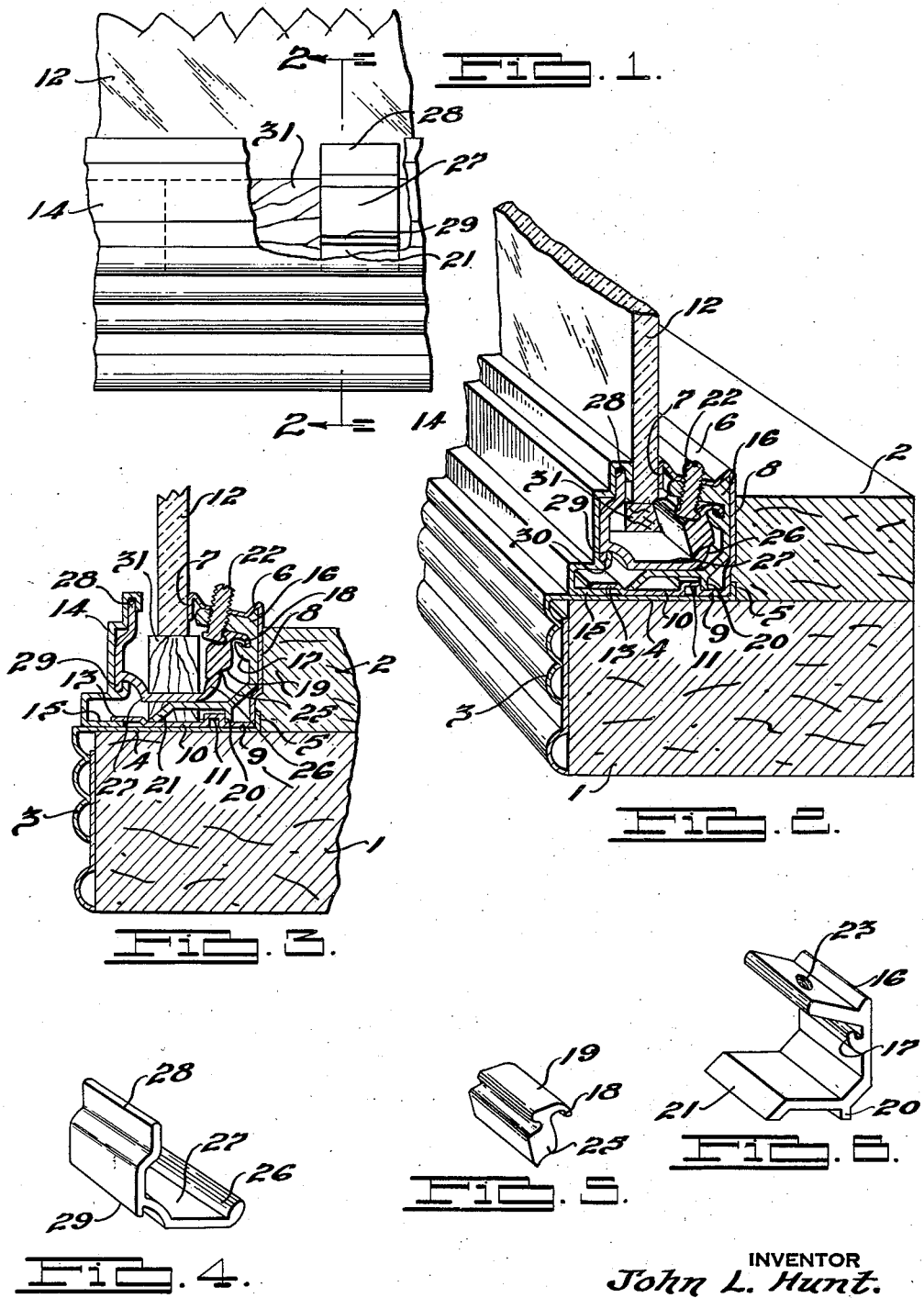
INVENTOR
John L. Hunt.
BY
ATTORNEY Patented July 20, 1937

2,087,516

UNITED STATES PATENT OFFICE 2,087,516

METAL WINDOW SASH

John L. Hunt, Detroit, Mich., assignor to Detroit Show Case Company, Detroit, Mich., a corporation of Michigan Application March 20, 1936, Serial No. 69,918

7 Claims. (Cl. 20—56.4)

This invention relates to metal window sash and the object of the invention is to provide a means for supporting and securing the glass in a metal window sash including a molding arranged to be drawn into contact with the front of the glass and arranged to firmly engage the same.

Another object of the invention is to provide a finish molding extending about the glass and provided with a draw bar secured therein, means being provided for drawing the draw bar to move the finish molding into engagement with the glass and separate guide means being provided for the lower edge of the finish molding to prevent the same from tilting or tipping when being drawn to position.

A further object of the invention is to provide a longitudinal sheet metal molding for the back of the glass having a member secured therein carrying an adjusting lever and adjusting screw, the said member being firmly secured in the molding and the sheet metal molding extending beneath the glass and being arranged to provide a guide for the lower edge of the front finish molding.

Another object of the invention is to provide a finish molding for the front of the glass and a sheet metal molding for the rear of the glass, the finish molding being arranged to receive a draw bar which is slidable longitudinally thereof and the sheet metal molding being arranged to receive a supporting member movable longitudinally thereof to alignment with the draw bar, the arrangement allowing the draw bars and supporting members to be positioned at spaced points along the edge of the glass and allowing any number of said members and draw bars to be used.

A further object of the invention is to provide a molding member carrying a screw having a circular head at the lower end thereof riding in a groove provided therefor in the lever whereby longitudinal movement of the screw will turn the said lever on its pivot.

These objects and the several novel features of the invention are hereinafter more fully described and claimed and the preferred form of construction by which these objects are attained is shown in the accompanying drawing in which—

Fig. 1 is a front view of the glass and finish molding, the molding being broken away to show the construction.

Fig. 2 is a sectional perspective taken on line 2—2 of Fig. 1.

Fig. 3 is a view similar to Fig. 2 showing the draw bar and finish molding moved outwardly.

Fig. 4 is a perspective view of the draw bar.

Fig. 5 is a perspective view of the lever.

Fig. 6 is a perspective view of the lever support.

The lever support in relation to the other parts is best shown in Figs. 2, 3 and 6 and a sill 1 is shown having an auxiliary sill member 2 forming a right angle channel in which the store front construction may be mounted. A metal molding 3 is applied to the front face of the support 1 and is formed with a flange 4 extending over the surface of the sill and having an upturned edge 5 abutting the auxiliary sill member 2.

The molding 6 behind the glass is formed of sheet metal and extends longitudinally along the back of the glass and is provided with a depending flange 7 engaging the back side of the glass. This sheet metal molding 6 is provided with a portion 8 engaging against the face of the sill member 2 and the face 8 is off-set at the bottom to clear the upturned edge 5 on the flange 4 of the molding 3. This sheet metal molding 6 is provided with portions 9 and 10 riding on the flange 4 of the molding 3 and a longitudinal rib 11 is formed in the metal between the portions 9 and 10 as shown. This sheet metal portion 10 extends beneath the glass 12 and is provided with an off-set flange 13 at the forward edge. The finish molding 14 on the front face of the glass is provided with a flange 15 riding on the flange 4 of the molding 3 and this flange 15 engages beneath the flange 13 of the sheet metal molding 6 and acts as a guide when the finish molding 14 is moved toward or away from the face of the glass 12. A support member 16 is fitted into the sheet metal molding 6 in the back of the glass and, as shown in Figs. 2, 3 and 6, this support member 16 is provided with a rib 17 over which the flange 18 of the lever 19 may be engaged as will be understood from Figs. 2, 3, 5 and 6. The support 16 is provided with a rib 20 at the bottom engaging against the rib 11 of the sheet metal molding 6 and is also provided with a depending flange 21 engaging against the shoulder formed by the off-set portion 13 of the molding as shown in Figs. 2 and 3. A screw 22 is threaded into the aperture 23 in the member 16 and this screw is provided with a circular head engaging in the groove 24 of the lever 19 to turn the same.

This lever 19 is provided with a curved cam face 25 and this face 25 normally engages against the upturned end 26 of the draw bar 27. This draw bar 27 is provided with an upwardly extending flange 28 engaging in a channel therefor in the upper edge of the finish molding 14 and is also provided with a flange 29 engaging in a channel 30 formed in the molding 14 as shown in Figs. 2 and 3. The glass 12 is supported on spaced supporting blocks 31 shown in Figs. 2 and 3 and the members 16, 19 and 27 are comparatively narrow in form and are positioned beneath the glass 12 and between the support blocks. In fact, in the ordinary window of this type, it is only necessary to provide two or three support blocks along the lower edge of the window. These support blocks 31 are positioned on the flange 14 of the molding 3 which rests on the sill 1, as will be understood from Fig. 3.

In assembling the device, the flange 15 of the finish molding 14 is engaged beneath the raised flange 13 of the sheet metal molding 6 and the draw bar 27 is moved inwardly so that the upturned end 26 engages beneath the cam face 25 of the lever 19. At this time by turning the screw 22 downwardly the lever is turned downwardly on its pivot so that the curved face 25 draws the end 26 of the draw bar to the left of Figs. 2 and 3 thus drawing the upper edge of the finish molding 14 into engagement with the glass 12 and these screws 22 which are spaced along the window frame provide a means for adjusting the face molding into firm engagement with the face of the window along the entire edge.

To replace the glass it is only necessary to unthread the screws 22 to the position shown in Fig. 3, at which time, the finish molding 14 on the draw bar may be withdrawn from the window frame to allow removal or replacement of the glass 12. Also, as will be understood from Fig. 3, this arrangement will allow glass of different thicknesses to be mounted in the store front and the screws 22 will allow adjustment of the finish molding 14 into firm engagement with the face of the glass.

In assembling the device, a series of support members 16 are fitted into the end of the molding 6 and are moved longitudinally of the molding to the desired positions. These positions are determined by the apertures through the flange 6 through which the ends of the screws 22 may extend. The members 16 are positioned so that the threaded apertures 23 therein align with the corresponding apertures in the member 6 and the lever 19 is then hooked over the flange 17 of the respective support member 16. The screw 22 is then inserted from underneath the aperture 23 and the circular head on the screw is engaged in the groove therefor in the lever as shown in Fig. 3. As this screw is then threaded through the aperture 23 by the fingers, the head of the screw rides into the groove of the lever and by applying a screw-driver on the slot on the end of the screw 22, the lever 19 may be raised to allow clearance for the upturned end 26 of the draw bar.

At this time, the desired number of draw bars which are narrow in width as shown in Fig. 1 are inserted in the ends of the channels in the finish molding 14 and moved longitudinally thereof to position opposite the support members 16. When so positioned, the finish molding 14 may be moved toward the face of the glass 12 with the flange 15 engaging beneath the flange 13 and the end 26 of the draw bar is moved to position beneath the cam face 25 on the lever 19. When this has been done, the glass supporting blocks 31 are positioned at desired intervals on the portion 10 of the sheet metal molding 6 and by inserting a screw-driver in the slots in the ends of the screw 22 these screws 22 may be turned downwardly to turn the levers 19 in a counter-clockwise direction and draw the draw bars inwardly until the upper edge of the finish molding engages the face of the glass 12. Also, at the same time, the tension of engagement of the upper edge of this molding may be varied by adjusting the screws 22 as desired.

It is to be particularly noted from Figs. 2 and 3 that the portion of the lever 19 below the groove for the circular end of the screw 22 is thicker than the portion of the lever above said groove. The pressure exerted by the circular end of the screw 22 is thus applied against the portion of greater thickness of the lever 19 in turning the lever to draw the draw bar toward the inner sash member and this provides great strength at this point for drawing the outer sash member inwardly. When the screw 22 is raised, the only pressure exterted is in raising the lever 19 on its pivot and consequently the portion of less thickness above the groove is of sufficient strength for this purpose.

From the foregoing description it becomes evident that the device is very simple and efficient in operation, will not easily get out of order, provides a store front construction which is neat in appearance and, at the same time, is adjustable to receive glass of different thicknesses and provides a device which accomplishes the objects described.

Having thus fully described my invention, its utility and mode of operation, what I claim and desire to secure by Letters Patent of the United States is—

1. A metal window sash comprising inner and outer sash members, a sill, the inner sash member having a base resting on the sill and extending toward the outer sash member, the edge of the base of the inner sash member toward the outer sash member being provided with a raised flange and the outer sash member being provided with a flange riding on the sill and arranged for sliding engagement beneath the raised flange of the inner sash member, a support member secured in the inner sash member and having a base, there being a glass between the inner and outer sash members supported by the base of the inner sash member, each of said sash members having flange portions for engagement with opposite faces of the glass, a lever pivotally mounted in said support member, a screw threaded through the support member and arranged upon movement in one direction to turn the lever on its pivot, a draw bar attached to the outer sash member, the lever being provided with a cam face and the draw bar being provided with an upturned end riding in engagement with said cam face whereby turning movement of said lever draws the draw bar and outer sash member toward said inner sash member, said draw bar slidably engaging the upper face of the said base of the support whereby pressure applied to the draw bar by the lever is prevented from tilting the outer sash member and causes the sash engaging flange thereof to move in parallel relation with the face of the glass and glass engaging flange of the inner member.

2. In a metal window sash, an inner and an outer sash member, a sill, the inner sash member having a base resting on the sill and extending toward the outer sash member at the bottom, the edge of the base of the inner sash member toward the outer sash member being provided with a raised flange and the outer sash member being provided with a flange riding on the sill and arranged for sliding engagement beneath the raised flange of the inner sash member, said base of the inner sash member further having a longitudinal rib occupying a plane above the raised flange, a support member slidable longitudinally of the inner sash member having a part engaging the said rib on the base of the inner sash member to prevent lateral displacement of the support member, a lever pivotally mounted in said support member, a screw threaded through the support member and arranged upon longitudinal movement in either direction to turn the lever on its pivot, a draw bar movable longitudinally of the outer sash member and riding in surface contact with a part provided on the support member, the lever being provided with a cam face and the draw bar being provided with an upturned end riding in engagement with said cam face, the arrangement being such that as the lever is turned on its pivot in one direction the draw bar and outer sash member are drawn toward the inner sash member.

3. In a metal window sash, an outer sash member and an inner sash member each provided with longitudinal ways, the inner sash member being formed of sheet metal, a support member slidably mounted in the longitudinal ways of the inner sash member, a draw bar slidably mounted in the longitudinal ways of the outer sash member and having an upturned end, a lever pivotally mounted in the support member and having a cam face engaging the upturned end of the draw bar, a screw carried by the supporting member and having a circular flange at the lower end, the lever being provided with a groove to receive said circular flange, the portion of the lever below the groove being of comparatively greater thickness than the portion of the lever above the groove, the threading of the screw in one direction exerting pressure against the lower side of the groove of the lever to draw the draw bar and outer sash member toward the inner sash member and threading of the screw in the opposite direction engaging the comparatively narrow portion of the lever at the top of the groove to turn the lever only on its pivot.

4. In a metal window sash, an outer sash member and an inner sash member each provided with longitudinal ways, a support member slidably mounted in the longitudinal ways of the inner sash member, a draw bar slidably mounted in the longitudinal ways of the outer sash member and having an upturned end, a lever pivotally mounted in the support member and having a cam face engaging the upturned end of the draw bar and a screw carried by the supporting member and arranged to turn the lever to draw the draw bar and outer sash member toward the inner sash member, the lower portion of the inner sash member extending beneath the draw bar and having an off-set edge and the outer sash member having an inturned edge engaging beneath the off-set edge of the inner sash member, said inter-engaging edges acting as a guide during movement of the outer sash member toward the inner sash member.

5. In a metal window sash, an outer sash member and an inner sash member each provided with longitudinal ways, a support member slidably mounted in the longitudinal ways of the inner sash member, a draw bar slidably mounted in the longitudinal ways of the outer sash member and having an upturned end, a lever pivotally mounted in said support member, a screw threaded through the support member and arranged to turn the lever on its pivot and the lever being provided with a cam face riding in engagement with the upturned end of the draw bar, the arrangement being such that turning movement of the lever in one direction on its pivot draws the draw bar and outer sash member toward the inner sash member.

6. In a metal window sash, an outer sash member and an inner sash member each provided with longitudinal ways, a support member slidably mounted in the longitudinal ways of the inner sash member, a draw bar slidably mounted in the longitudinal ways of the outer sash member and having an upturned end, a lever pivotally mounted in the support member and having a cam face engaging the upturned end of the draw bar and a screw carried by the support member and arranged to turn the lever to draw the draw bar and outer sash member toward the inner sash member.

7. In a metal window sash, an outer and an inner sash member, the inner sash member being formed of sheet metal and having a base, a vertical portion and an upper flange extending over the base, the outer sash member having a base, a vertical portion and an upper flange, the vertical portion and upper flange of the outer sash member both being formed with grooves the openings of which face toward each other, the base of the inner member having a terminal raised edge to receive the base of the outer member and further having a longitudinal rib adjacent the base of said vertical portion thereof, the upper flange of the inner member at its junction with the vertical portion being shaped to provide an inwardly facing groove, a support member having a base portion provided with a part slidably engaging the rib on the base of the inner member and having a vertical portion and an inwardly extending flange portion located beneath the inwardly extending flange of the inner member and provided with a rib engaging in the said groove formed at the junction of the said upper flange and vertical portion of the inner sash member, a draw bar having a vertical portion shaped to slidably engage in the grooves of the outer sash member and an inwardly extending portion riding in contact with the base of the said support and an upwardly inclined edge portion, the support member having a groove in its outer face, the lever having a part at one end rotatably engaging in the groove and shaped at the other end to engage the upwardly inclined edge of the draw bar, said lever having a groove in its outer face, and a screw threaded in the upper flange of the support and extending through an aperture provided in the upper flange of the inner member, said screw having an enlarged end portion of greater diameter than the threaded portion engaging in the groove of the lever whereby in threading the screw upwardly or downwardly the lever is turned in one direction or the other to exert pressure on the draw bar to draw the outer sash member to engagement with the glass or to relieve it from pressure to permit withdrawal of the outer sash element from the glass engaging position.

JOHN L. HUNT.